W. A. WOODWARD.
Draft-Adjuster for Plow.

No. 205,327. Patented June 25, 1878.

WITNESSES:
Francis McArdle.
C. Sedgwick

INVENTOR:
W. A. Woodward
BY Munn &Co
ATTORNEYS.

N. PETERS, PHOTO-LITHOGRAPHER, WASHINGTON, D. C.

UNITED STATES PATENT OFFICE.

WILLIAM A. WOODWARD, OF NORTH TUNBRIDGE, VERMONT.

IMPROVEMENT IN DRAFT-ADJUSTERS FOR PLOWS.

Specification forming part of Letters Patent No. 205,327, dated June 25, 1878; application filed February 25, 1878.

*To all whom it may concern:*

Figure 1:
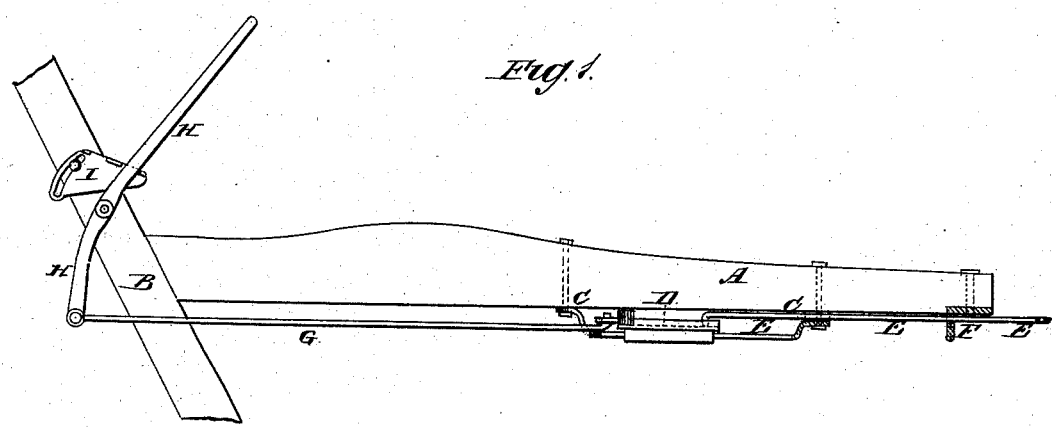
Figure 2:
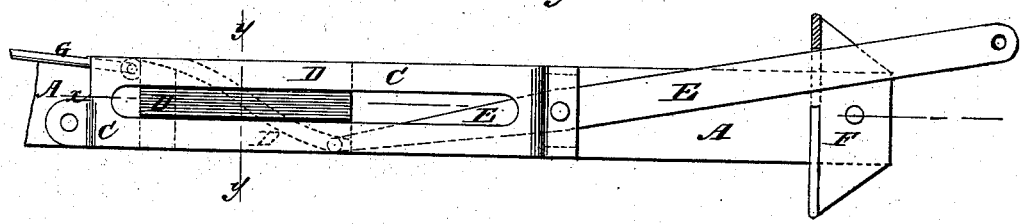
Figure 3:
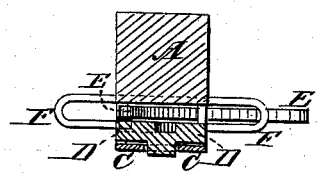

Be it known that I, WILLIAM ALBERT WOODWARD, of North Tunbridge, in the county of Orange and State of Vermont, have invented a new and useful Improvement in Draft-Adjusters for Plows, of which the following is a specification:

In the accompanying drawings, forming part hereof, Figure 1 is a side view of a plow-stock to which my improvement has been applied, partly in section, through the line $x\ x$, Fig. 2. Fig. 2 is a view of the under side of a part of the same enlarged. Fig. 3 is a cross-section of the same, taken through the line $y\ y$, Fig. 2.

Similar letters of reference indicate corresponding parts.

The invention relates to plows intended to be used in land containing stumps or large stones; and the object is to enable the plowman to avoid said stumps or stones by shifting the draft to either side of the beam instead of lifting the heavy plow by muscular power.

Referring to the drawings, A represents the beam, and B the handle, of a plow-stock. To the under side of the beam A is attached a keeper, C, the ends of which are bent upward and then outward, and are bolted to the beam A, to raise its middle part and form a space to receive a sliding block, D. The keeper C is slotted longitudinally to receive a feather formed upon the block D, to keep the said block in place as it moves back and forth.

E is a lever, which passes through a notch in the forward end of the keeper C, and is pivoted by the bolt that secures the said end of the keeper to the plow-beam. The rear end of the lever E is bent downward at right angles, or has a pin attached to it to enter a groove in the upper side of the block D. The groove in the block D passes diagonally across it and is slightly curved toward an S form, so that the longitudinal movement of the block D will turn the lever E upon its pivot. The forward part of the lever E passes through a keeper formed upon the rear edge of a plate, F, attached to the forward end of the plow-beam A. The forward end of the lever E projects beyond the forward end of the beam A, and to it the draft is applied.

The rear part of the upper side of the sliding block D has a raise formed upon it, or a thin cross-bar attached to it, to prevent the said block from pressing upon the lever E and causing it to bind.

To one corner of the rear end of the sliding block D is attached an eye to receive a hook formed upon the forward end of the rod G, which passes through a notch in the rear corner of the keeper C.

The rear end of the rod G is pivoted to the lower end of the lever H, which is pivoted to the handle B, and the upper end of which projects into such a position that it may be readily reached and operated by the plowman.

The upper part of the lever H moves along a catch-plate, I, attached to the handle B, and which has notches formed in it to receive the lever H and lock it in position when adjusted.

The catch-plate I is attached adjustably to the handle B, so that it may be moved up or down upon the said handle B, to shorten or lengthen the throw of the lever H.

If desired, the slot in the keeper C may be made inclined or curved, and the lever E moved upon its pivot by the lateral movement of the block D as it is moved back and forth.

Having thus described my invention, I claim as new and desire to secure by Letters Patent—

1. The combination of the slotted keeper C, the diagonally-grooved sliding block D, the pivoted draft-lever E, the plate-keeper F, the rod G, and the hand-lever H with the beam and handle, as shown and described.

2. The combination of the adjustable catch-plate I with the lever H, the handle B, and the mechanism G D E, as and for the purpose specified.

3. The combination of the adjustable catch-plate I with the lever H and the handle B, substantially as herein shown and described.

WILLIAM ALBERT WOODWARD.

Witnesses:
  E. R. HYDE,
  W. B. PORTER.